H. S. COMBS.
WIRE NETTING MACHINE.
APPLICATION FILED JULY 2, 1909.
983,539.
Patented Feb. 7, 1911.
10 SHEETS—SHEET 8.
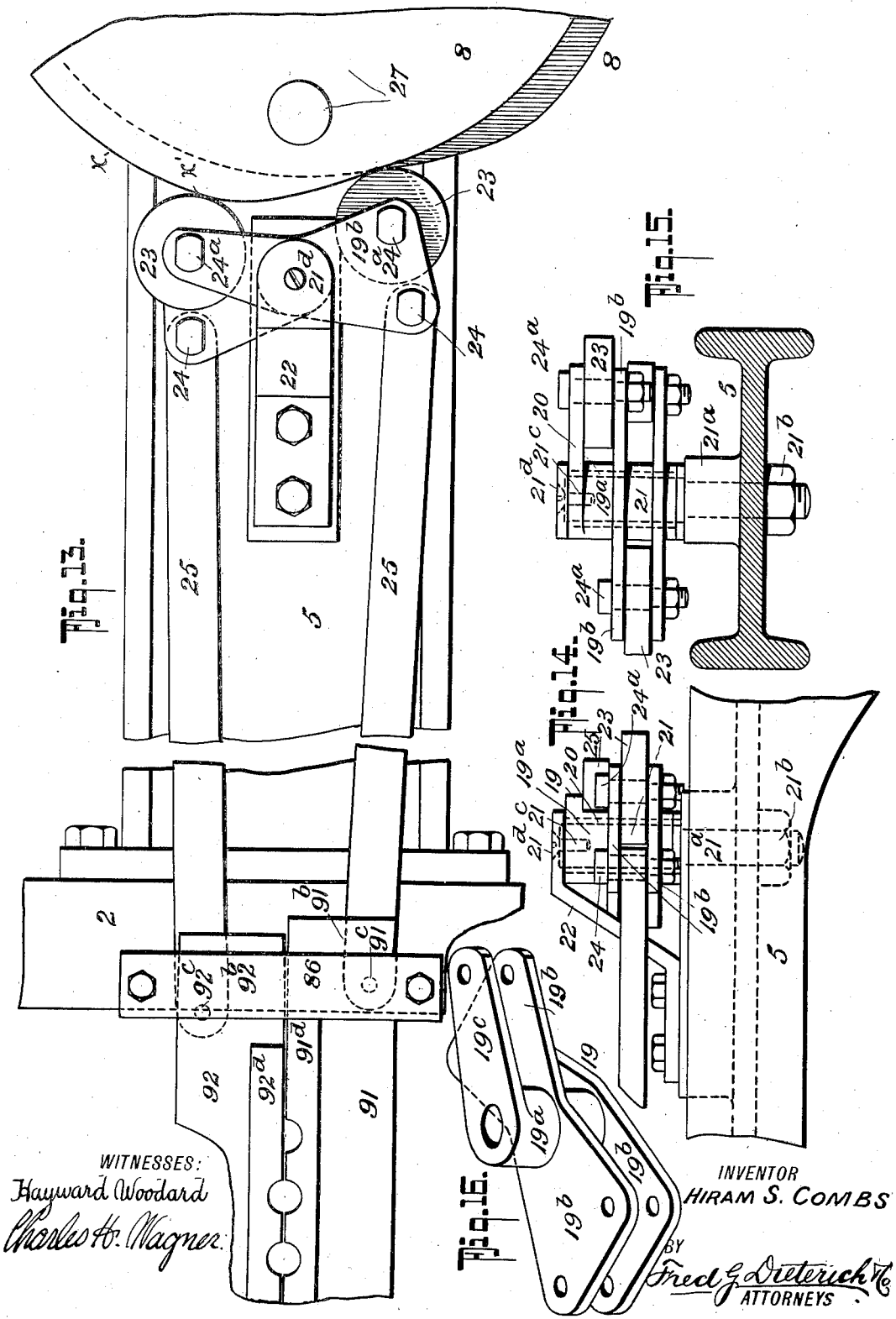
WITNESSES:
Hayward Woodard
Charles H. Wagner.
INVENTOR
HIRAM S. COMBS
BY
Fred G. Dieterich
ATTORNEYS H. S. COMBS.
WIRE NETTING MACHINE.
APPLICATION FILED JULY 2, 1909.
983,539.
Patented Feb. 7, 1911.
10 SHEETS—SHEET 9.
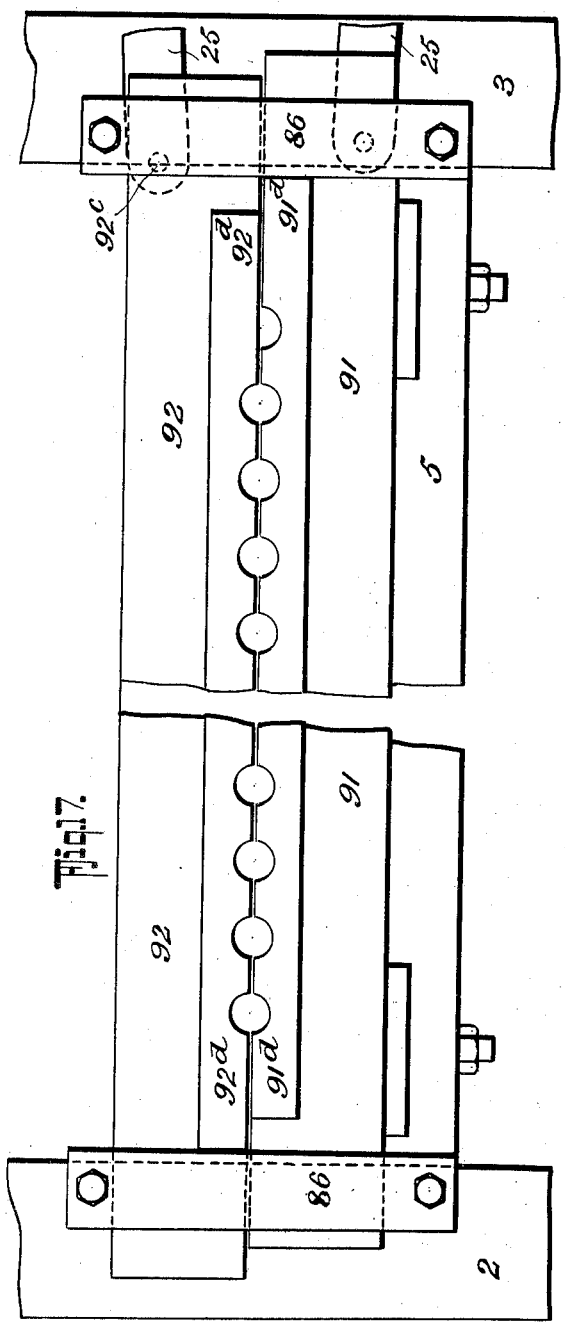
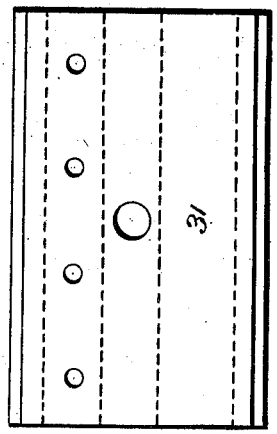
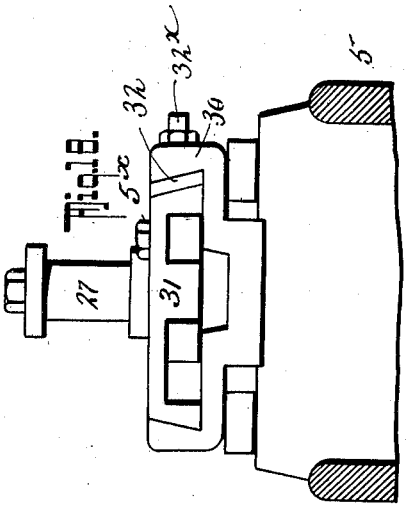
WITNESSES:
Hayward Woodard
Charles H. Wagner
INVENTOR
HIRAM S. COMBS
BY
Fred G. Dieterich & Co.
ATTORNEYS

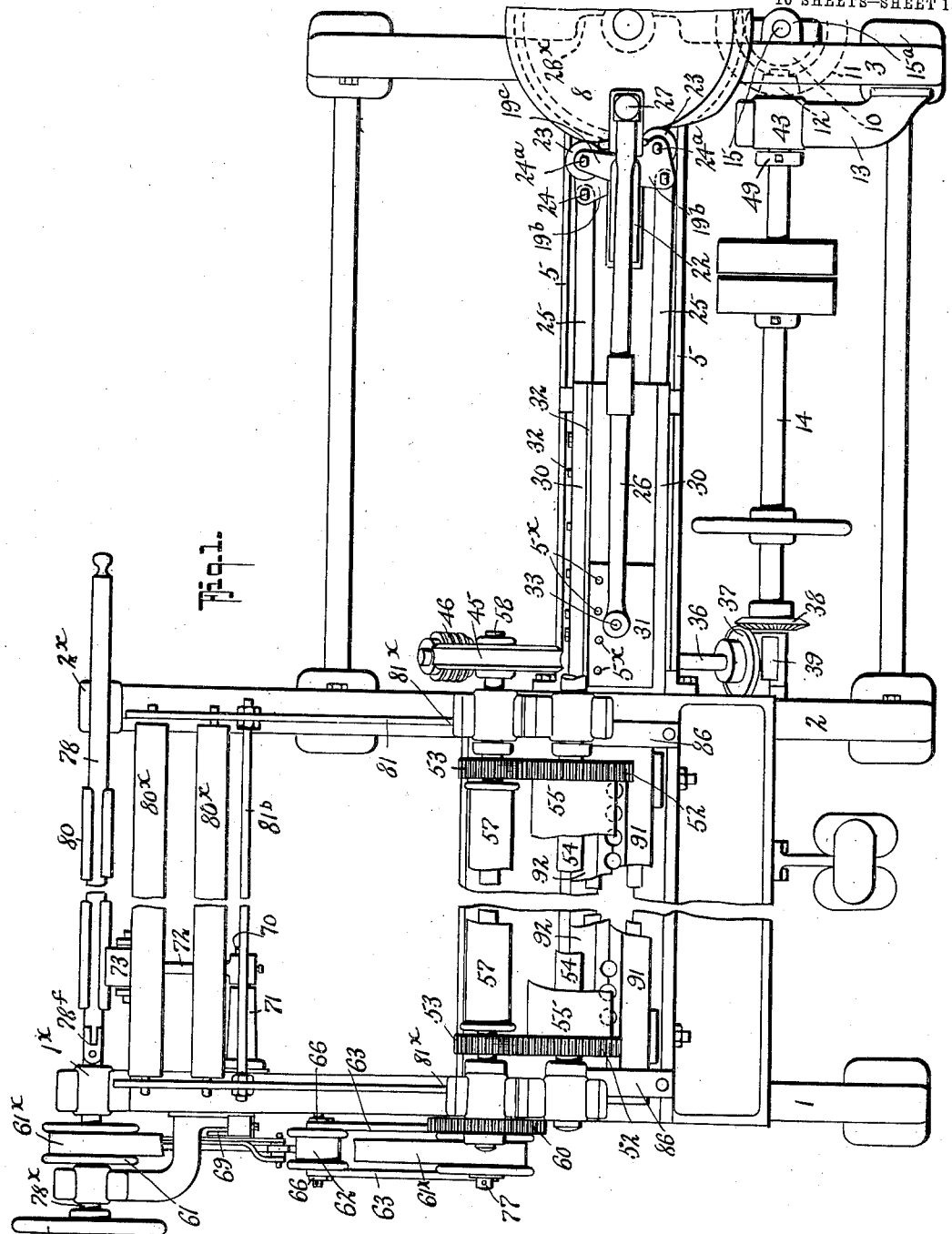

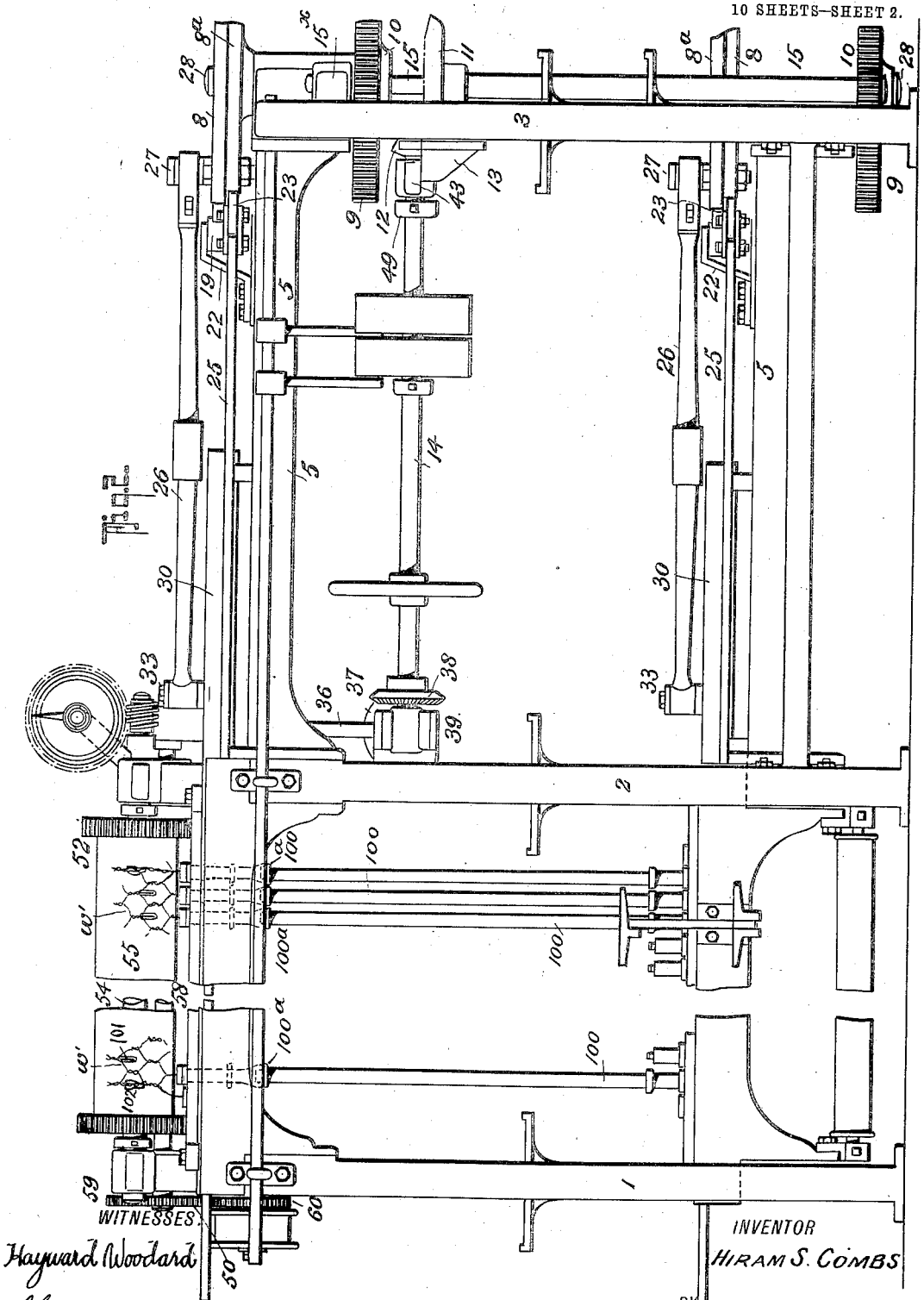

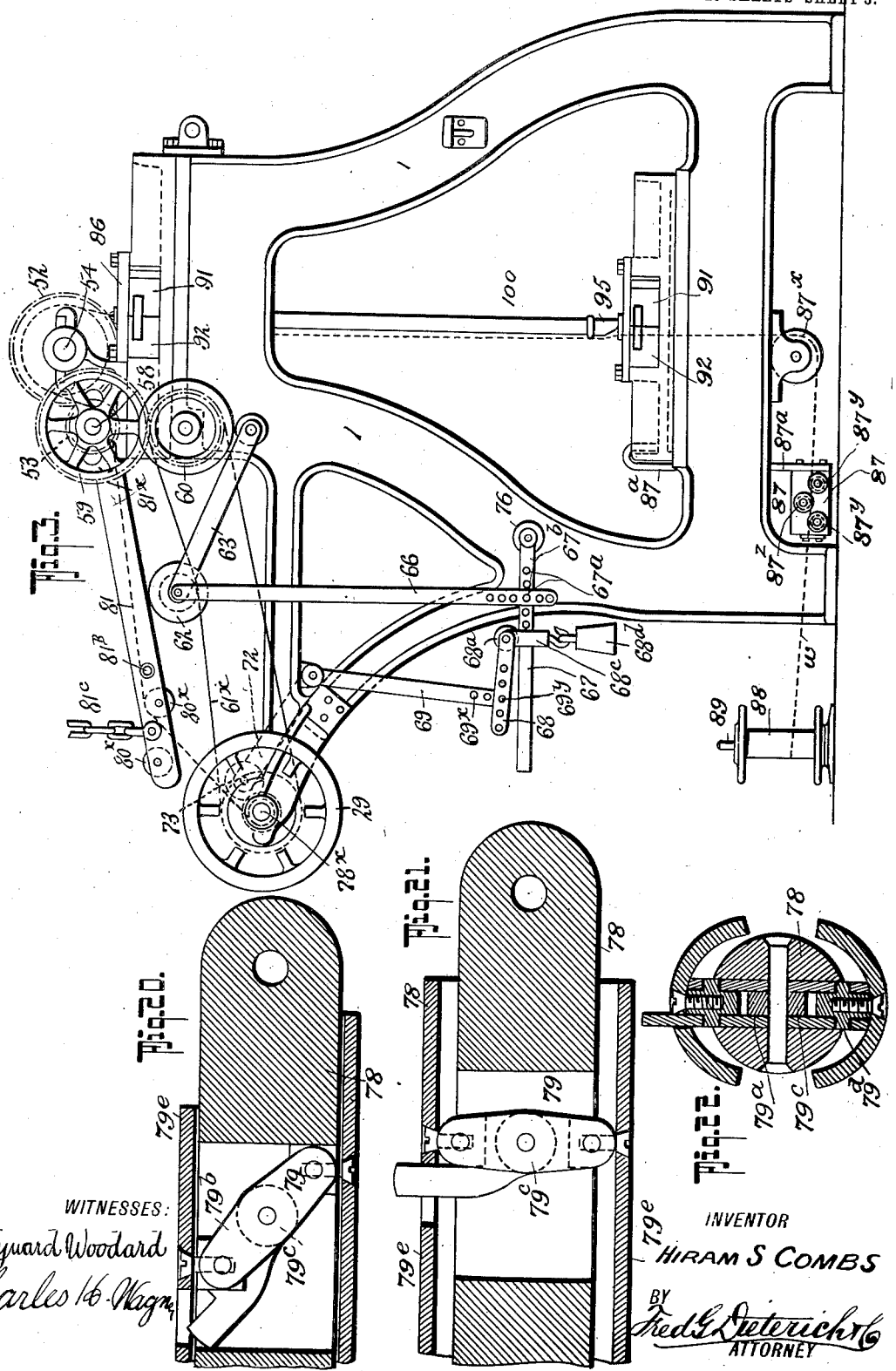

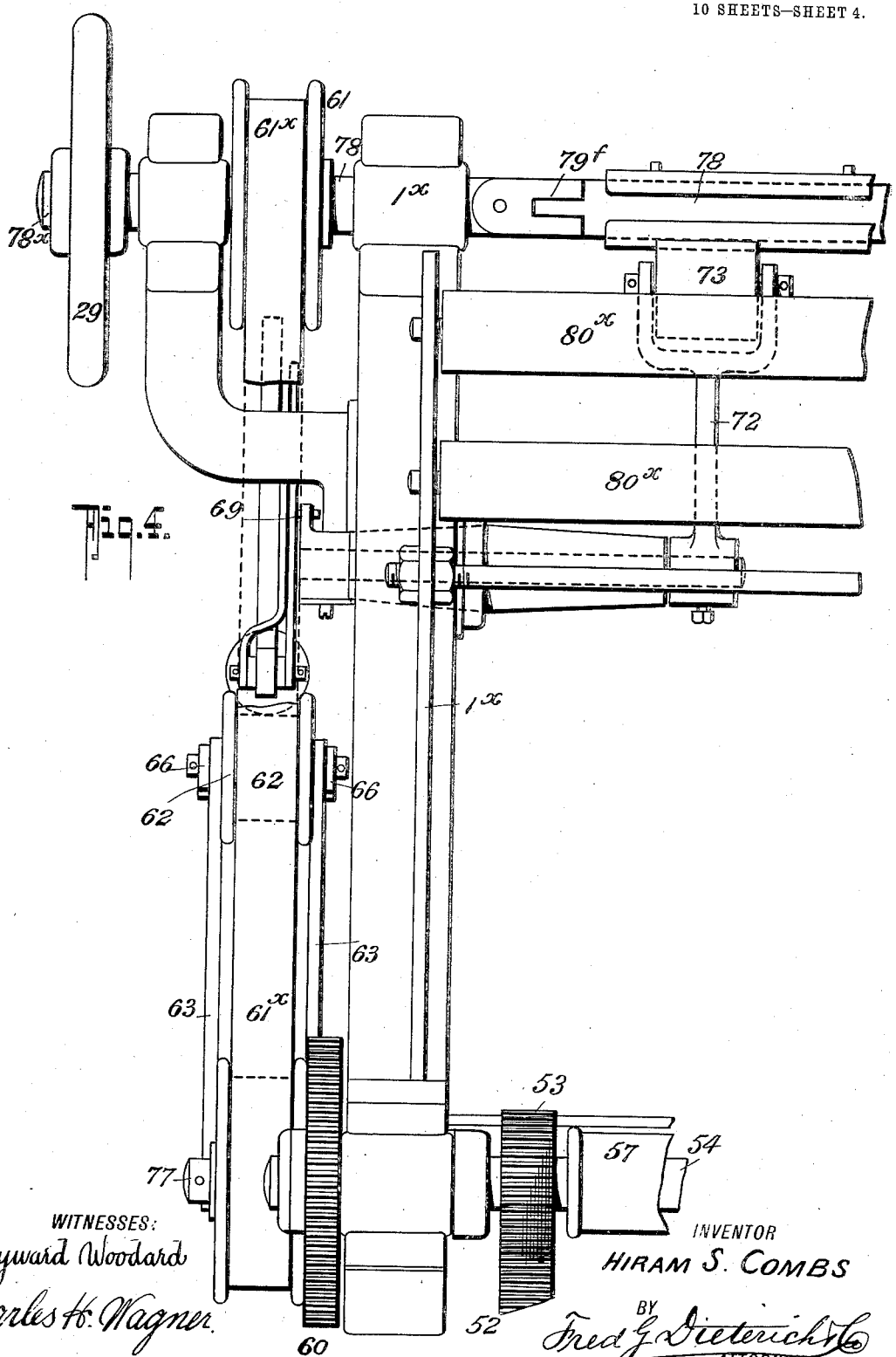

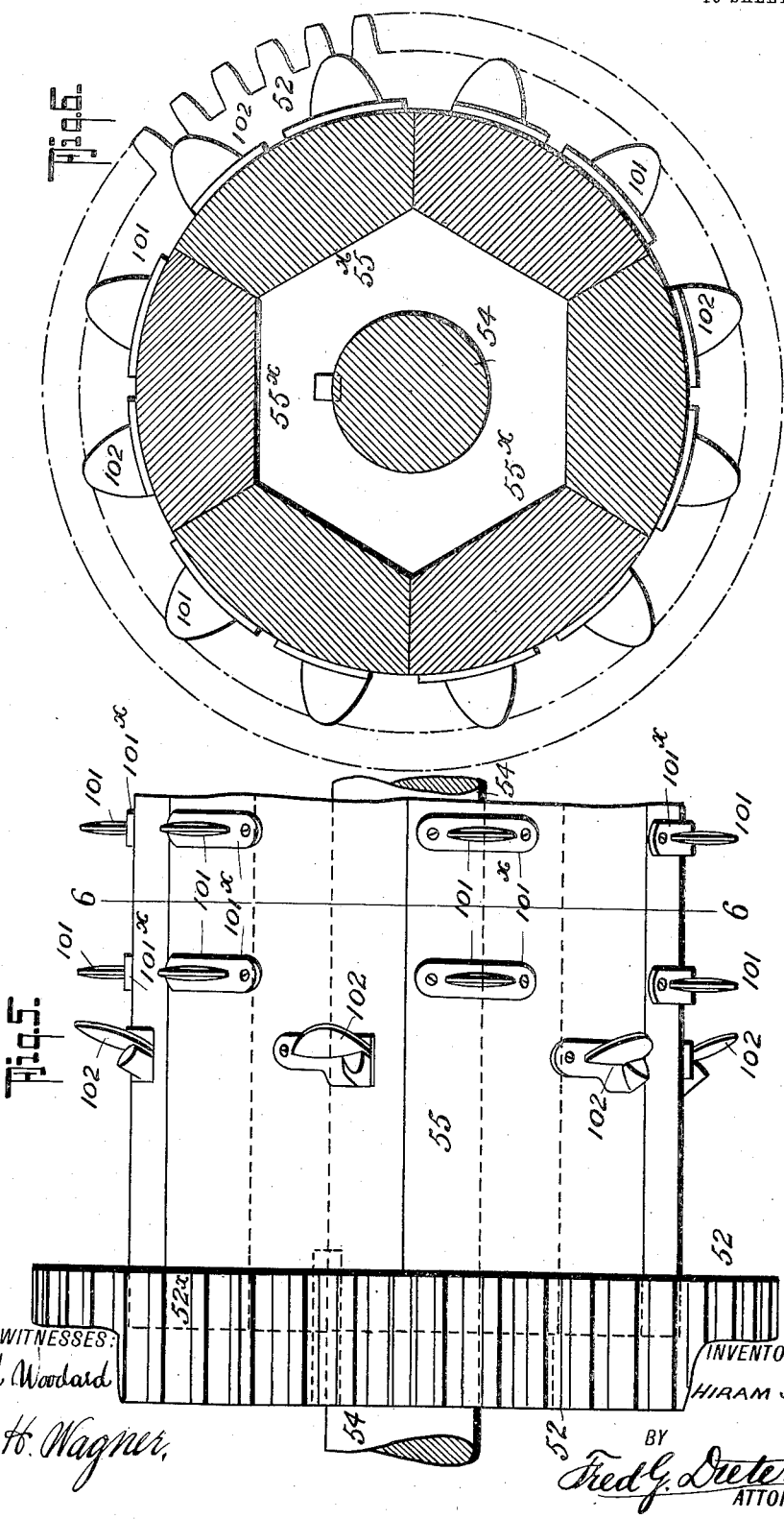

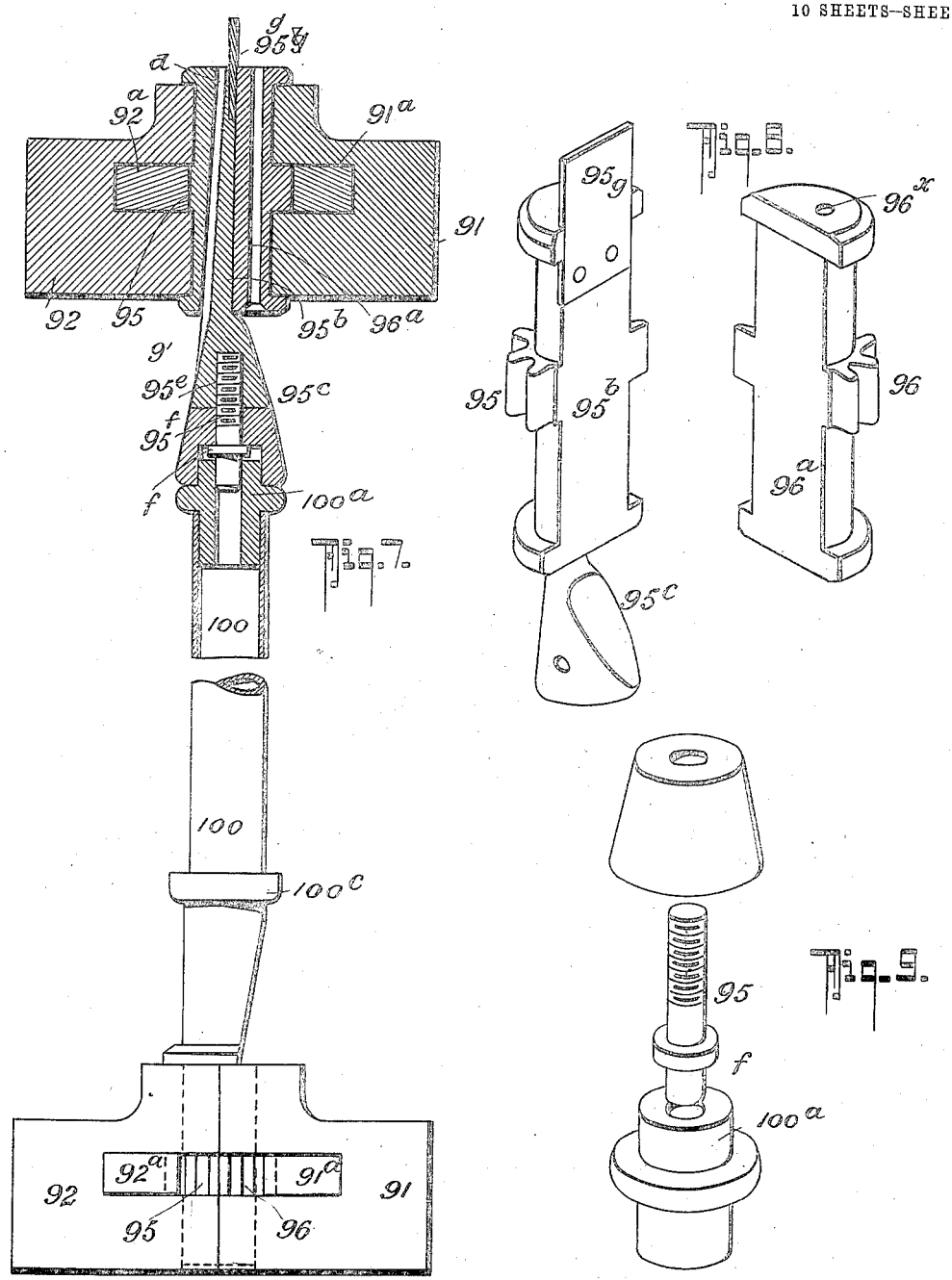

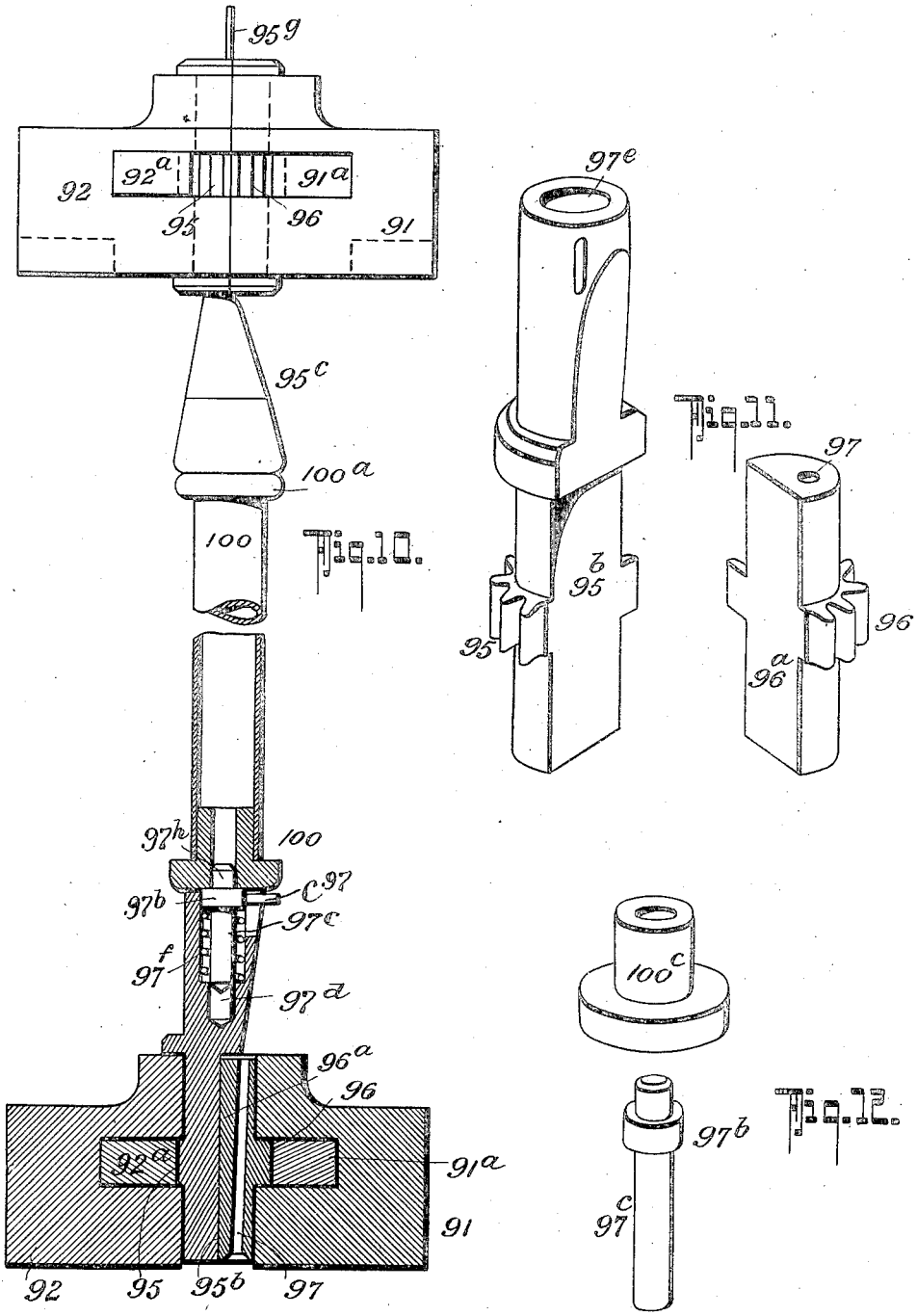

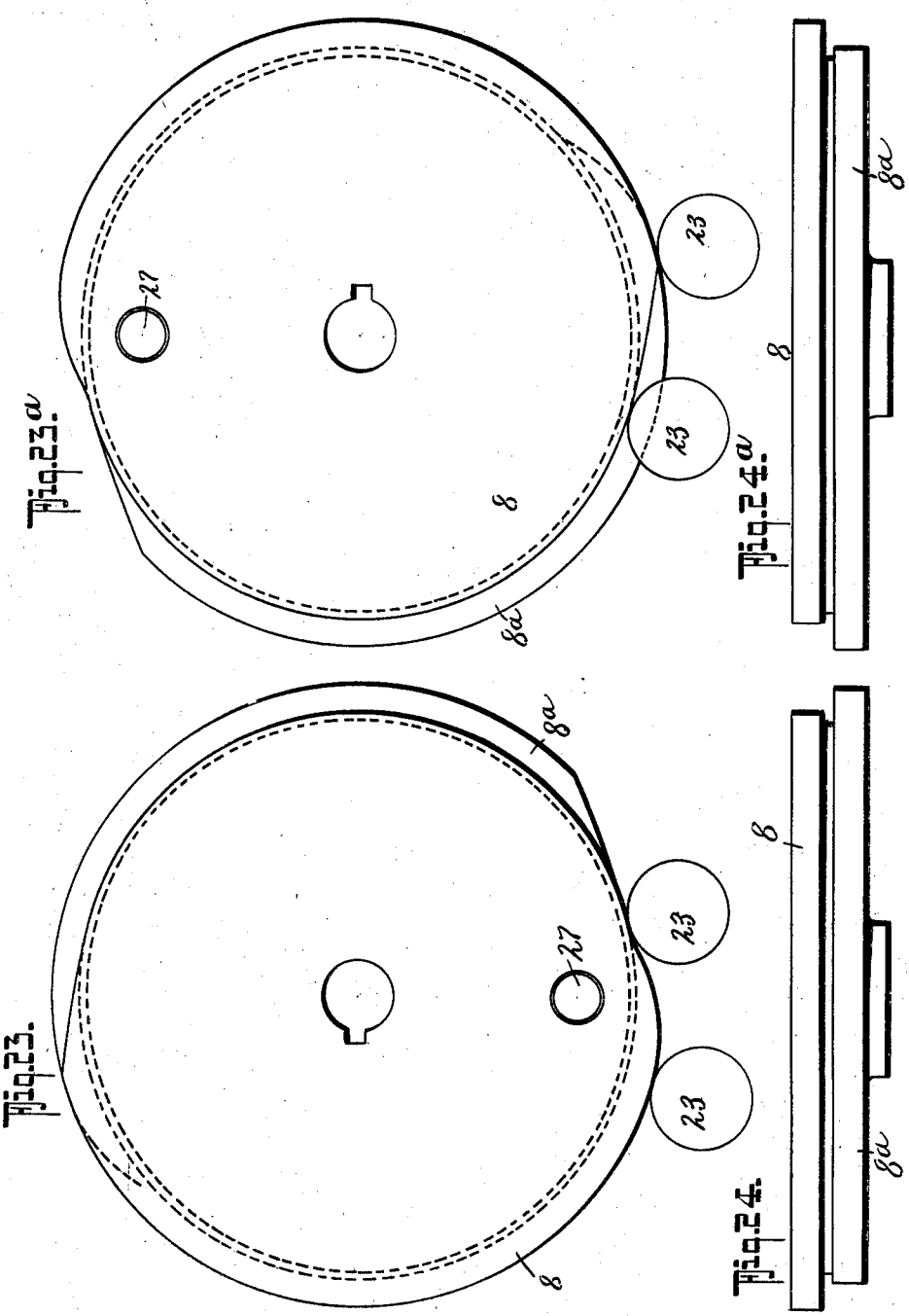

UNITED STATES PATENT OFFICE.

HIRAM S. COMBS, OF NORWALK, CONNECTICUT, ASSIGNOR TO MARY F. SAUNDERS, OF NORWALK, CONNECTICUT.

WIRE-NETTING MACHINE.

983,539.

Specification of Letters Patent.

Patented Feb. 7, 1911.

Application filed July 2, 1909. Serial No. 505,659.

*To all whom it may concern:*

Be it known that I, HIRAM S. COMBS, at present residing at Norwalk, in the county of Fairfield and State of Connecticut, have invented a new and Improved Wire-Netting Machine, of which the following is a specification.

This invention relates to that type of machines for making wire netting, the construction of which is embodied in the reversely rotatable twister heads or devices that operate to twist and interlace the wire strands together, means that coöperate with the twisters that move them back and forth in such manner as to form netting composed of a series of parallel wires that are twisted together at predetermined intervals to produce uniform meshes, and in which the twisting mechanisms operate under right and left hand movement,—suitable coacting devices being also provided that automatically take up the wire from the bobbins and spools, and that automatically roll up the finished product.

In its more specific nature, my present invention comprehends certain general and detailed improvements in the construction of the machine disclosed in Patent No. 743248 issued to me November 3, 1903, which improvements will hereinafter be fully explained, it being here mentioned that my present improvements are resultant from practical experience with the machine constructed as shown in the patent referred to, and the main purpose of my present invention is to provide a machine embodying the general characteristics of what is shown in the patent aforesaid, in which the coöperative arrangement of the several parts has been especially designed to overcome certain deficiencies in the accurate operation of the working parts thereof to render the operation the more positive, to increase the efficiency and to materially reduce the cost of construction and operation.

In the practical use of the machine disclosed in the patent aforesaid, while I have found the operation of the several sub-mechanisms and the entire mechanism as practically accomplishing the results desired, I have also found that the coöperative arrangement of the several parts requires a too careful adjustment to render them positive and accurate in their action, and particularly entailing a too expensive construction.

Among other features, the latch mechanism utilized in the patented machine for holding the shifter frames locked to their alternately shifted positions during the time the twister devices are reversely rotated, I have found as especially requiring too many coacting parts, requiring accuracy of adjustment to so relatively set the latch or locking members to hold the shifter bars whereby a positive alinement of the two alternately shiftable rotary twister head half-sections is provided for. Again, in the use of the latch devices shown in the patent aforesaid, the latch members being of a resilient nature and their adjustment being controlled by shifting of eccentric bushings at their fulcrum heads frequently necessitates stoppage of the machine to re-adjust the parts for a perfect or positive action.

My present invention, among other important features, comprehends an improved construction of the means for actuating the shifter bars that control the reversely rotatable movements of the twister heads and the proper setting or alining of the two half-sections that constitute each twister head, and a much simplified means for positively stopping the end thrusts in opposite directions of the shifter frames, in which the yielding or resilient members and the eccentric bushing devices used in my patent referred to are entirely dispensed with, and the construction of the means for controlling the movement of the shifter frames and the twister heads is rendered much more economical, easier to manufacture and to assemble and adjust for actual use.

In its more complete nature, my invention, in the means for controlling the movement of the shifter frames and devices for rotating the twister heads, includes a new arrangement of cam devices for accurately effecting the throw of the shifter frames, that coöperate with the crank pin, pitman and cross-head devices for actuating the rack-bars, in a manner similar to the means shown in my patent mentioned and hereinafter specifically pointed out.

Another object of my present invention is the simplifying and arrangement of the two-part twister head gears or heads and the bobbins that coöperate therewith, the latter in the present construction being arranged to have a more positive mounting with respect to the socket ends of the upper and lower twister heads with which they removably connect.

My present invention also presents certain improvements in the drive-gear mechanism that transmits the desired motion from the main drive shaft to the take-up drum over which the finished product passes and from which it feeds to the take-up roller.

My present invention, in its more complete nature, includes a simplified and improved means that automatically provides a proper counterpoise for the continuously increasing size of the take-up roller and in such manner that a uniform tension is maintained on the netting during the operation of manufacturing it.

In its still more subordinate features, my present invention consists in certain details of construction and peculiar combination of parts, all of which will be hereinafter fully described, specifically pointed out in the appended claims, and illustrated in the accompanying drawings, in which:—

Figure 1 is a top plan view of my improved wire netting making machine. Fig. 2 is a front elevation thereof. Fig. 3 is an end elevation, looking at the end that carries the automatically adjustable tension devices hereinafter specifically pointed out. Fig. 4 is a detail plan view of that end of the machine on which the tension devices are mounted. Fig. 5 is a plan view of a portion of the spur equipped drum. Fig. 6 is a cross section thereof, taken practically on the line 6—6 on Fig. 5. Fig. 7 is a side elevation of one of the twister bobbins, with the upper and lower twister heads attached, the upper head and a part of the upper end of the bobbin being in vertical section. Fig. 8 is a detail perspective view of one of the end port upper twister heads. Fig. 9 is a detail view of the bearing members that coact with the said upper head and the bobbin. Figs. 10, 11, and 12 are views similar to Figs. 7, 8 and 9 but showing one of the lower twister members and the bearing that coacts therewith. Fig. 13 is a plan view of the inner ends of the shifter studs, the stop member at the corresponding end, and the slide shifting mechanism hereinafter fully explained. Fig. 14 is a side elevation. Fig. 15 is an end elevation of the rocker devices that connect with the shifter slides. Fig. 16 is a detail perspective view of one of the rockers. Fig. 17 is a diagrammatic plan view of the shifter slides and shows the end stops therefor. Fig. 18 is an end elevation of the cross head that connects with the rack bar that actuates the twister heads. Fig. 19 is a plan view of the said cross head. Figs. 20 and 21 and 22 are detail sectional views of a portion of the take up roller hereinafter again referred to. Fig. 23 is a diagrammatic plan, and Fig. 23$^a$ is an end view of the combined cam and crank plate, showing the same in position of having moved the roller bearings that join with the shifter bars in one direction. Figs. 24 and 24$^a$ are like views of the said cam and crank plate showing the said rollers shifted to the opposite position.

In the practical arrangement of my present invention, the main or supporting frame comprises main end members 1—2 upon which the twister and wire net conveying and take up mechanisms are mounted and a supplemental end member 3 on which the shifter bar, the take up and the conveyer actuating means are mounted in the manner hereinafter described in detail.

In my present construction of wire netting machine the warp wires $w$ pass under a horizontal guide roller 87$^x$ the same as in my patented machine referred to, the said wires $w$ passing from a series of spools 88 suitably mounted on a stand 89 and from the spools through a tension selvage device 87 supported on hangers 87$^a$—87$^a$ in advance of the roller 87$^x$, the said device 87 comprising essentially a pair of horizontally disposed roller guides 87$^y$—87$^y$ and a pressure or tension roller 87$^z$, the journals of which are held in adjustably mounted boxes 8, clearly understood by reference to Fig. 3 of the drawings. The warp wires $w$ pass upwardly from the roller 87$^x$ through upper and lower twister gears to interengage with the woof wires $w'$ carried on the bobbins, all of which will be hereinafter fully explained.

14 designates a horizontally disposed drive shaft, the outer end of which is journaled in a boxing 43 mounted on a bracket 13 on the frame standard or member 3. Shaft 14 carries an adjustable collar 49 which, with the small bevel gear 12 on the outer end of the said shaft, holds the shaft from endwise play. Gear 12 meshes with a larger bevel gear 11 mounted on the upright drive shaft 15 mounted in the bearing brackets 15$^x$—15$^a$ at the upper and lower ends of frame member 3, said shaft 15 having a driving pinion 10 at each end as best shown in Fig. 1, by reference to which it will be also noticed that each pinion 10 meshes with a main driving gear 9, one of which is keyed to each of, what is hereinafter termed, the cam and gear shafts 28—28, suitably journaled in brackets 28$^x$—28$^x$ on the frame member 3, and each of the said shafts 28 carries a combined crank plate or cam, the construction of which and their coöperative connection with the shifter bars and twister heads forming an essential feature of my present invention.

5—5 designate longitudinal bed members that connect with the end frames 2 and 3 and upon the said members are bolted the parallel guide members 30—30 that form the guides for a cross head 31 attached to a connecting rod or pitman 26, the outer end of which connects with the wrist or crank pin 27 secured to the cam members 8, the other end being joined to a pin 33 that extends up from the cross head 31 as clearly shown in Figs. 1 and 2, it being obvious that the desired reciprocable motion is constantly imparted to the cross head 31 and its attached parts, hereinafter described, so long as the power shafts 14 and 28 rotate.

The cross heads 30 (of which there is an upper and a lower) as now constructed, see Figs. 18 and 19 is a short bar of steel whose outer edges are beveled to engage undercut adjacent edges of the guide member 30 that is secured on the frame portions 5 by the stud bolts $5^x$ and to provide for proper running of the head 31 through the guide 30 a gib or wear piece 32 is removably held on one side of the guide 30 which is arranged to be shifted to provide the desired perfect bearing of the parts by a set screw $32^x$.

In my patented machine before referred to, a train of gears comprising ten or more parts is provided for imparting motion from the main drive shaft to the net receiving and feeding drum, and the indicator devices. This train of gearing I have dispensed with and substituted therefor the power transmitting mechanism best shown in Fig. 2, by reference to which it will be seen the shaft 14 carries a bevel pinion 38 that meshes with a like pinion 37 on a diagonally disposed shaft 36 journaled in bearing brackets 39 on the frame member 2, the upper end of which carries a worm gear 46 held in mesh with a large gear 45 on a shaft 58 that extends across the top of the machine between the end members 1 and 2 and carries roller 57 that acts as a combined guide and pressing roller, it being hereinafter termed the "back roller" since it is located parallel with, but in the rear of net receiving and backward conveying spur equipped drum 55, as clearly shown in Fig. 1.

Shaft 58 carries a gear 53 that meshes with a larger gear 52 keyed on the shaft 54 that carries the take-up and backward conveying drum 55, the construction of which is shown in detail in Fig. 5, and it consists of a head formed of a series of segmental sections $55^x$ wedged together to form the cylindrical surface and whose ends are held fast by reason of extending into annular sockets $52^x$ formed on the inner faces of the gears 52. On each of the sections $55^x$ is attached a series of center clips or spurs 101, each having a curved base $101^x$ for conveniently screwing them into the wooden sections $55^x$. Coöperating with the clips $101^x$ is a series of other clips 102—102, they being, in practice, arranged in rights and lefts, and these clips are mounted on the sections $55^x$ at points midway each transverse pair of clips 101, the outer ends of said clips 102—102 alining horizontally with the other clips. Clips $101^x$, of which, in practice, there are preferably 55 and the end clips 102, which engage the selvage ends of the netting are spaced a distance equal the distance between every four teeth of the racks that actuate the twisters hereinafter described, so as to provide for a uniform backward conveying of the netting as it passes up from the numerous twister heads onto the said roll 55. The netting, as it is conveyed backwardly from the roll 55 passes under the back roll 57 and from thence to the take up roller 80 that is journaled in open bearings formed in the horizontally and rearwardly projected extensions of the frame portions $1^x$ and $2^x$ and the same in practice is detachably supported in its bearings in any suitable manner to permit its being readily lifted out to permit the removal of the net roll therefrom.

In my present construction, I form the shaft 78 of the take up roll of two sections joined by a hinged connection or universal joint $79^f$ in such manner that the outer end of the said shaft 78 can be lifted out of its open bearing to permit of sliding off the wire rolled thereon. The shaft section $78^x$ carries a hand wheel 29 for starting the wind of the netting and it also has attached to it a band pulley 61 over which takes an endless belt $61^x$ that passes over a flanged pulley mounted on a stud 77 on the main frame and carrying a gear 60 that meshes with a gear 59 on the back roller shaft 58 and through which rotary motion is imparted to the take up roller before referred to.

For guiding the netting to the gradually increasing roll as it winds on the take-up roller, yielding guide devices are provided consisting of side arms 81 fulcrumed at their inner ends $81^x$—$81^x$ on the main frame and connected by a cross or stay rod $81^b$, and in the said arms 81 are mounted guide rolls $80^x$—$80^x$ between which the netting passes as it feeds onto the take-up roll, and to sustain the arms 81 as desired each has a hook $81^a$ to receive supporting chains $81^c$, as shown.

In my present construction of wire netting machine, I have included an improved construction of tension means best shown in Fig. 4, by reference to which it will be seen a presser roll 73 is mounted in the outer bifurcated end of an arm 72 clamped on a stub shaft 70 journaled in a long bearing 71 and which has a pendent lever arm 69 clamped therein, the lower end of which has a series of apertures $69^x$ for a coupling pin $69^y$ for adjustably connecting the lever 69 with a traveling weight carrying arm 68 that also carries a roller $68^a$ that rides on an arm 67 fulcrumed on a stud 76 and on which hangs a U-shaped bracket $68^c$ upon which the weight $68^d$ is suspended. Arm 67 is also formed with a series of apertures 67ᵃ to receive a lock pin 67ᵇ for adjustably connecting an arm 66, the upper end of which pivotally joins with one of a pair of arms 63 fulcrumed at 65 on the outside of frame member 1 and which carry a flanged idler pulley 62 that rides on the endless belt that conveys motion to the take-up roller.

By arranging the tension means in the manner shown and described, the desired frictional tension of the endless drive belt on the pulley that drives it and the take-up roller is automatically maintained and at the same time an automatic shifting of the weight on lever arm 67 is effected since the gradual increase of wire wound upon the take-up roller relatively swings lever 72 upwardly and the lever 69 outwardly, the movement stated of the latter serving to gradually roll the weight outwardly on the arm 67.

*The shifter slides and the operating means therefor.*—In my present machine, the construction of the shifter slide mechanism and the means for actuating the same forms the most essential feature of my invention and at this point it should be stated that from practical experience with machines of the type generally disclosed in my patent hereinbefore mentioned, the efficiency of the machine and the desired grade of the product is dependent on a positive and accurate shifting and temporary locking or stopping of the said shifter bars during the operation of twisting the warp and woof wires to the desired mesh.

Since the construction and operation of the upper and lower sets of slides and their actuating means as also the upper and lower twister heads and their operating means are alike, a detailed description of but one set of the said several devices or mechanisms will suffice for both sets.

91 designates the front slide and 92 the back slide and each of which has a corresponding number of semicircular alternately coacting bearings for the half gears of the twister heads combined with the bobbins, to be presently described. Each of the slides 92 and 91 has a longitudinal groove 92ᵃ—91ᵃ on the inner or rubbing face that register and form the slideways for the rack bars that actuate the twisters and each of the slides 92—91 has an under cut seat 92ᵇ—91ᵇ at the end next the frame 2 to receive the inner ends of the link or thrust members 25—25 that impart the reciprocable movements to the slide bars when actuated by the cams 8—8ᵃ, shown in detail in Fig. 13, and presently again referred to, the said members 25—25 being secured by the coupling pins 92ᶜ—91ᶜ.

At this point it should be stated that while the cam devices 8—8 have such connection with the links 25 that they impart a predetermined amount of movement alternately to the slides, to prevent the slightest variance of the slide movement provided for by a prior adjustment of the parts, I have provided stop bars 86—86 that are made fast to the framing and extend transversely thereof and in line to be engaged by the shouldered ends 92ᵈ—91ᵈ of the slides, said bars being so positioned relatively to the twister devices and the cams 8—8ᵃ that the slides, when they shall have been moved so their gear seats, are in perfect alinement will engage the stops 86, which, it should be stated, also serve another and important function, since in connection with the cams 8—8ᵃ they form a means for positively locking the slides to their shifted position during the time the twister heads do their work. That this feature of my invention may be readily understood, attention is now directed to Fig. 13, which shows in detail the construction of the combined cam and locking gear devices and the oscillating devices controlled by the cams and which connect with the link arms 25—25. The oscillating devices consist essentially of a rocker 19 comprising a central long hub 19ᵃ mounted upon a bushing 20, in turn mounted upon a stud pin 21 having a stepped portion 21ᵃ that passes down through the frame portion 5, the lower end being threaded to receive a clamp nut 21ᵇ and the upper end having a threaded tap 21ᶜ to receive a clamp screw 21ᵈ that seats in a countersunk aperture in a short longitudinally extended brace 22 that fits in the top of the hub 19ᵃ and is bolted to the frame piece 5 as shown.

Hub 19ᵃ has a pair of transversely projected wings 19ᵇ, each of which is substantially of triangular shape, the outer or corner ends of each of which have vertically alining apertures to receive the coupling pins 24 and 24ᵃ, a third wing 19ᶜ being projected to one side which also has an aperture in the outer end that registers with the other apertures at the corresponding side that receive the coupling pin 24ᵃ. Pins 24 are utilized for coupling the ends of the link arms 25—25 to the rockers while the pins 24ᵃ—24ᵃ are used as bearings for rollers 23—23 oppositely disposed and positioned in different horizontal planes to bring them in proper horizontal alinement with the two cams 8—8ᵃ with which they at all times are held in engagement.

The cams 8—8ᵃ are formed on a single disk like plate, the construction of which is best shown in diagrammatic plan and side views thereof, Figs. 23 and 24ᵃ by reference to which it will be noticed the two cam portions are of identical shape and arranged as opposites so that as one cam is pushing against its coacting roller bearing 23, and pushing one link member 25, the other cam portion is relatively so positioned that the other roller bearing 23 and the link member 25 connected thereto is forced in the opposite direction, the movement of the two members 25—25 being such that a maximum sliding action of the two bars 91—92 has been effected with the shoulder $91^d$ abutting the innermost stop bar 86, see Figs. 13 and 17 and the shoulder $92^d$ at the front end abutting the stop bar 86 at such end, as clearly shown in Fig. 17, by reference to which it will also be noticed that when the slides 91—92 have been thus shifted to the limit of the movement the half bearings for the twister heads are in perfect alinement and to positively hold them locked to such position during the time the twister mechanisms accomplish their work I have constructed the cam devices in the manner best shown in Figs. 23, $23^a$, 24 and $24^a$ to which reference is now made.

When the slides 91—92 are as in Fig. 17 the link arms and the rocker devices are as indicated in Fig. 13, the roller bearings 23—23 being similarly positioned in Fig. 23.

It should be stated the two cam faces, designated the upper and the lower, are constructed alike, but are oppositely disposed and constructed in such manner that as the cam portion $x$ approaches roller 23 with the uprise face $x'$, the declining surface of the lower cam portion that coöperates with the face $x'$ is just crossing the lower or opposite roller, thus allowing the rocker devices, as they are now being shifted by cam action on the upper roller 23 to shift the arms 25 and at the same time hold and push the other or lower roller 23 against the declining cam face $x'$, it being understood that while this action is going on the correspondingly shaped cam faces $x$—$x'$ on the diametrically opposite side of cam disks 8—$8^a$ are "dead" and these will not come into play until the disks 8—$8^a$ complete the next half revolution.

It will be noticed that each cam disk has two circumferential bearing surfaces, one of which $x^2$ is of a larger radius than the other $x^3$, the smaller surface extending from the innermost dip of the cam portion at one side, to the beginning of the outward inclines $x'$ at the other side, it being understood that the bearing surfaces $x^2$—$x^3$ on the upper and lower cam disk portions 8—$8^a$ being oppositely disposed so that, assuming the cams to be turning in the direction of the arrow $y$ on Fig. 23, when the high part of cam $x^2$ engages roller 23, the lower or smaller radius face $x^3$ on the lower cam will be engaging the other wheel 23 and as both rollers or wheels 23—23 now engage cam faces of true circles but relatively smaller diameter, both rollers will be positively held to the position shown in Figs. 13 and 23 until the cam faces $x'$—$x^2$ at the opposite side come into play when the positions of the rollers 23—23 are changed to that shown in Fig. $23^a$ and the arms 25—25 and the slides 91—92 are correspondingly shifted to the opposite direction and position indicated in Figs. 13 and 17 and are held positively locked to the said position until the first described cam faces $x$ and $x^2$ again come around into action. It will be also noticed from Figs. 1, 2, 13, and 23, that the wrist or crank pin on the actuating cam is so located, relatively to the cam portions that when the rollers 23—23 have been moved to the position shown in Fig. 23, the pitman that moves the cross head that controls the rack bars that actuate the twister heads is at its foremost position and is now ready to pull the said cross head backwardly, which movement continues until the pin reaches the position shown in Fig. $23^a$, that is, during the period the slides 91—92 are held locked to the position shown in Fig. 17 the twister heads are rotated in one direction to interlace the wires $w$—$w'$, it being understood the same motion in a reverse direction is transmitted to the twister heads after the rollers (and the slides 25—25) have been shifted to the position shown in Fig. $23^a$.

The twister mechanism, the construction of which is best shown in Figs. 7 to 12, inclusive, in my present invention embody the same general arrangement of parts as in the patented machine hereinbefore referred to. The upper heads or twister gears, see Figs. 7, 8 and 9 each consist of the two half gears 95—96, one of which 95 is integral with a long body portion $95^b$, the upper portion of which is semi-circular in cross section and to its flat face at the upper end is riveted the single twister blade $95^g$. The lower end of the member 95 has a pendent circular portion $95^c$, one face of which has the entrance $95^d$ to the wire aperture $d$ that extends up through the member 95 and ends back of the twister blade $95^b$, and the said portion $95^c$ also has a screw socket $95^e$ to receive the screw stud $95^f$, the lower end of which has a stepped bearing $f$ to seat in a tubular top head $100^a$ for the bobbin 100. Coöperatively connected with the half section 95 is the half section 96 that has a flat face for engaging the flat face of section 95 and flanges at the upper or lower edges that project over the upper and lower faces of the slide bars 91—92 and the said half section is also formed with a wire passage $96^x$, as clearly shown in Fig. 7.

The lower twister devices or heads are constructed similar to the upper heads, and the said lower twister devices differ from like parts in the patented machine referred to, in the tubular head or block $100^c$ normally, that is, when the bobbin is wound rests on the collar $97^b$ of a stud pin $97^c$ whose lower end rides in a socket $97^d$ and whose upper or bobbin engaging stud $97^h$ is normally held up in the bobbin by a coiled spring $97^f$ in an enlarged socket portion $97^e$.

Pin $97^c$ has a finger piece $c^{97}$ that projects through slot $d^{97}$ as clearly shown in Fig. 10, by reference to which it will be seen that to release the bobbin it is only necessary to depress the finger $c^{97}$ to force the stud $97^h$ down out of the bobbin.

The half gear member of the lower head is vertically apertured as at $g^7$ for the passage therethrough of the warp wire $w$ that extends up from the guide roll, as clearly shown in the drawings. The take-up roll, in my present construction, is made up of a central shaft 78 and two half circle pipe sections $79^e$ that are connected by cross links 79 centrally fulcrumed at $79^a$ and pivotally connected at their ends $79^c$ to the brackets $79^d$ and each of the said links has a spur adapted to project through slots in the casing pipe sections so as to form radial projections for receiving the ends of the woven wire when the parts of the take-up roll are at their operative position, as shown in Fig. 21 and to drop down below the periphery of the said sections $79^e$ when the parts of the roll are collapsed as shown in Fig. 21.

In the general operation the wire shifting and twisting operations are effected in the manner well-known in this type of machines and as clearly defined in the patent hereinbefore mentioned, and hence the details of such operation need not be here repeated.

Among other and essential advantages found in my present construction is that the slides that carry the twister heads are always shifted to a positively predetermined degree, back and forth, and are rigidly held, as it were, locked to the shifted positions during the entire operation of twisting, the yielding or rattling means for holding the slides such as have heretofore been provided having been entirely dispensed with. The other advantageous features of my present form will readily appear to those skilled in this art, from the foregoing description when taken in connection with the accompanying drawings.

Having thus described my invention, what I claim and desire to secure by Letters Patent, is:—

1. In a wire netting machine of the character described, oppositely shiftable divided twister gear carrying slides, a means for actuating the slides and the gears, and other means for positively stopping the slides at the limit of their predetermined movement.

2. In a wire netting machine of the character described, oppositely shiftable twister gear carrying slides, stops at the limit of movement of the slides, and means for actuating the twisting gears and locking the slides between the said stops during the wire twisting operation.

3. In a wire netting machine of the character described, alternating shiftable twister gear carrying slides and means for reciprocating the slides, actuating the twisting gears, and holding them positively locked in their shifted positions.

4. In a wire netting machine of the character described, alternately shiftable twister gear carrying slides, and means for reciprocating the slides and holding them locked in their shifted positions, the said means also operating to actuate the twister gears while the slides are held locked.

5. In a wire netting machine of the character described, alternating shiftable gear carrying slides, and a shifting device therefor, and a cam-actuated means for operating the shifting device at times while it turns the twister gears.

6. In a wire netting machine of the character described, alternately shiftable gear carrying slides, a shifting device therefor, and a cam for actuating the said shifting device at times and for holding the said device locked to its shifted position at other times.

7. In a wire netting machine of the character described, alternately shiftable twister gear carrying slides, a shifting device therefor, a cam for actuating the said shifting device and for locking the slides in their shifted positions and other devices for operating the twister gear actuated by the said cam.

8. In a wire netting machine of the character described, alternately shiftable twister gear carrying slides, a shifting device therefor, a cam for actuating the said shifting device and for locking the slides in their shifted positions and other devices for operating the twister gear actuated by the said cam while the slides are held locked.

9. In a wire netting machine of the character described, alternately shiftable twister gear carrying slides, shifting device therefor, stops against which the slides abut at their extreme movements, a cam for actuating the shifting device said cam including portions for positively locking the said parts to their shifted positions and means for actuating the carriers while the slides are held locked.

10. In a wire netting machine of the character described, reversely shiftable twister gear carrying slides, a shifting device therefor, the said device comprising a rocker member having oppositely disposed bearing portions and oppositely disposed link arms that join with the slides, a cam for engaging the bearing portions of the rocker member adapted for oscillating the said rocker member and having other portions for positively holding the rocker member to its oscillated position.

11. In a wire netting machine of the character described, reversely shiftable twister gear carrying slides, a shifting device therefor, the said device comprising a rocker member having oppositely disposed bearing portions and oppositely disposed link arms that join with the slides, a cam for engaging the bearing portions of the rocker member adapted for oscillating the said rocker member and having other portions for positively holding the rocker member to its oscillating position, and means operated by the cam for actuating the twister gears while the rocker member is held to its oscillating positions.

12. In a wire netting machine, the following elements in combination; alternately shiftable slides, twister gears mounted thereon, rack bars for actuating the gears, a device for shifting the slides, a rotary cam for actuating the shifting device, a cross head connected with the rack bars, a crank pin on the rotary cam and a pitman connecting the pin with the cross head, the said crank pin and the shifting device being relatively arranged whereby the rack bars will be actuated while the shifter devices are held at rest.

13. In a wire netting machine of the character described, the combination with a set of slides, each having half journal bearings in their meeting faces, divided twister heads mounted in the said bearings, rack bars for rotating the gears, and a cam device for shifting the slides at predetermined times and for shifting the rack bars when the slides are at rest.

14. The combination with the take up roll, a drive gearing and an endless belt drive that joins the gearing with the take up roll; of a tension device that comprises an angle lever rockably mounted and having one end held to engage the product as it is being wound up on the take up roll, a weight carrying lever arm fulcrumed on the framing, the tension pulley mounted on the drive belt arm that couples the pulley carrier with the weight carrying lever, the weight having a roller bearing movable on the weighted lever, the said weight having a lever arm pivotally joined thereto and connected with the angle lever that engages the material being wound upon the take-up roll.

HIRAM S. COMBS.

Witnesses:
  PERCY J. EDWARDS,
  GEO. H. VOSBURGH.